United States Patent
Lawson et al.

(10) Patent No.: US 9,621,733 B2
(45) Date of Patent: *Apr. 11, 2017

(54) METHOD AND SYSTEM FOR A MULTITENANCY TELEPHONE NETWORK

(71) Applicant: Twilio, Inc., San Francisco, CA (US)

(72) Inventors: Jeff Lawson, San Francisco, CA (US); John Wolthuis, San Francisco, CA (US); Evan Cooke, San Francisco, CA (US)

(73) Assignee: Twilio, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/097,206

(22) Filed: Apr. 12, 2016

(65) Prior Publication Data
US 2016/0269564 A1 Sep. 15, 2016

Related U.S. Application Data

(63) Continuation of application No. 14/626,427, filed on Feb. 19, 2015, now Pat. No. 9,357,047, which is a (Continued)

(51) Int. Cl.
*H04M 7/00* (2006.01)
*G06F 9/50* (2006.01)
(Continued)

(52) U.S. Cl.
CPC .......... *H04M 7/0033* (2013.01); *G06F 9/505* (2013.01); *G06F 9/5077* (2013.01);
(Continued)

(58) Field of Classification Search
CPC ............... H04M 7/0033; H04M 7/006; H04M 3/42323; H04M 3/523; H04M 3/36;
(Continued)

(56) References Cited

U.S. PATENT DOCUMENTS 5,274,700 A   12/1993   Gechter et al.
5,526,416 A    6/1996   Dezonno et al.
(Continued)

FOREIGN PATENT DOCUMENTS

DE   1684587 A   3/1971
EP   0282126 A   9/1988
(Continued)

OTHER PUBLICATIONS

"Ethernet to Token ring Bridge"—Black Box Corporation, Oct. 1999 http://blackboxcanada.com/resource/files/productdetails/17044.pdf.
(Continued)

*Primary Examiner* — Quynh Nguyen
(74) *Attorney, Agent, or Firm* — Jeffrey Schox

(57) ABSTRACT

A method and system for operating a multitenancy telephony system including a call queue that stores call requests received from a plurality of users; an expandable and contractible telephony resource cluster that establishes call sessions for call requests; a analysis system that calculates capacity requirements of the system; a resource allocator that manages the scaling and operation of the telephony resource cluster; and a plurality of telephony network channels that are used as telephony communication channels for call sessions.

20 Claims, 8 Drawing Sheets

Related U.S. Application Data continuation of application No. 14/158,281, filed on Jan. 17, 2014, now Pat. No. 8,995,641, which is a continuation of application No. 13/632,872, filed on Oct. 1, 2012, now Pat. No. 8,737,593, which is a continuation of application No. 12/716,127, filed on Mar. 2, 2010, now Pat. No. 8,315,369.

(60) Provisional application No. 61/156,758, filed on Mar. 2, 2009, provisional application No. 61/249,493, filed on Oct. 7, 2009, provisional application No. 61/296,270, filed on Jan. 19, 2010.

(51) Int. Cl.

| | | |
|---|---|---|
| *H04M 3/51* | (2006.01) | |
| *H04M 1/247* | (2006.01) | |
| *H04M 3/36* | (2006.01) | |
| *H04M 3/523* | (2006.01) | |
| *H04L 29/12* | (2006.01) | |
| *H04L 12/803* | (2013.01) | |
| *H04L 29/06* | (2006.01) | |
| *H04L 29/08* | (2006.01) | |
| *H04M 3/42* | (2006.01) | |
| *H04M 15/34* | (2006.01) | |

(52) U.S. Cl.
CPC .......... *G06F 9/5083* (2013.01); *H04L 47/125* (2013.01); *H04L 61/2564* (2013.01); *H04L 65/1016* (2013.01); *H04L 67/10* (2013.01); *H04M 1/2473* (2013.01); *H04M 3/36* (2013.01); *H04M 3/367* (2013.01); *H04M 3/42323* (2013.01); *H04M 3/51* (2013.01); *H04M 3/5158* (2013.01); *H04M 3/523* (2013.01); *H04M 3/5235* (2013.01); *H04M 7/006* (2013.01); *H04M 15/34* (2013.01); *H04M 2201/39* (2013.01); *H04M 2201/40* (2013.01); *Y02B 60/142* (2013.01); *Y02B 60/167* (2013.01)

(58) Field of Classification Search
CPC .. H04M 15/34; H04L 65/1016; H04L 47/125; H04L 67/10
USPC ........................................ 379/220.01, 265.09
See application file for complete search history.

(56) References Cited

U.S. PATENT DOCUMENTS

| | | | |
|---|---|---|---|
| 5,581,608 A | 12/1996 | Jreij et al. | |
| 5,598,457 A | 1/1997 | Foladare et al. | |
| 5,867,495 A | 2/1999 | Elliott et al. | |
| 5,934,181 A | 8/1999 | Adamczewski | |
| 5,978,465 A | 11/1999 | Corduroy et al. | |
| 6,026,440 A | 2/2000 | Shrader et al. | |
| 6,034,946 A | 3/2000 | Roginsky et al. | |
| 6,094,681 A | 7/2000 | Shaffer et al. | |
| 6,138,143 A | 10/2000 | Gigliotti et al. | |
| 6,185,565 B1 | 2/2001 | Meubus et al. | |
| 6,192,123 B1 | 2/2001 | Grunsted et al. | |
| 6,206,564 B1 | 3/2001 | Adamczewski | |
| 6,223,287 B1 | 4/2001 | Douglas et al. | |
| 6,232,979 B1 | 5/2001 | Shochet | |
| 6,269,336 B1 | 7/2001 | Ladd et al. | |
| 6,317,137 B1 | 11/2001 | Rosasco | |
| 6,363,065 B1 | 3/2002 | Thornton et al. | |
| 6,373,836 B1 | 4/2002 | Deryugin et al. | |
| 6,425,012 B1 | 7/2002 | Trovato et al. | |
| 6,426,995 B1 | 7/2002 | Kim et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,463,414 B1 | 10/2002 | Su et al. | |
| 6,493,558 B1 | 12/2002 | Bernhart et al. | |
| 6,496,500 B2 | 12/2002 | Nance et al. | |
| 6,501,739 B1 | 12/2002 | Cohen | |
| 6,501,832 B1 | 12/2002 | Saylor et al. | |
| 6,507,875 B1 | 1/2003 | Mellen-Garnett et al. | |
| 6,571,245 B2 | 5/2003 | Chun et al. | |
| 6,574,216 B1 | 6/2003 | Farris et al. | |
| 6,577,721 B1 | 6/2003 | Vainio et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,129 B1 | 3/2004 | Bauer et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,792,093 B2 | 9/2004 | Barak et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,820,260 B1 | 11/2004 | Flockhart et al. | |
| 6,829,334 B1 | 12/2004 | Zirngibl et al. | |
| 6,831,966 B1 | 12/2004 | Tegan et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,928,469 B1 | 8/2005 | Duursma et al. | |
| 6,931,405 B2 | 8/2005 | El-Shimi et al. | |
| 6,937,699 B1 | 8/2005 | Schuster et al. | |
| 6,940,953 B1 | 9/2005 | Eberle et al. | |
| 6,941,268 B2 | 9/2005 | Porter et al. | |
| 6,947,417 B2 | 9/2005 | Laursen et al. | |
| 6,947,988 B1 | 9/2005 | Saleh | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,985,862 B2 | 1/2006 | Stroem et al. | |
| 6,999,576 B2 | 2/2006 | Sacra | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,062,709 B2 | 6/2006 | Cheung | |
| 7,065,637 B1 | 6/2006 | Nanja | |
| 7,076,037 B1 | 7/2006 | Gonen et al. | |
| 7,076,428 B2 | 7/2006 | Anastasakos et al. | |
| 7,089,310 B1 | 8/2006 | Ellerman et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,136,932 B1 | 11/2006 | Schneider | |

(56) References Cited

U.S. PATENT DOCUMENTS

| | | |
|---|---|---|
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,024,785 B2 | 9/2011 | Andress et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,139,730 B2 | 3/2012 | Palma et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,319,816 B1 | 11/2012 | Swanson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,565,117 B2 | 10/2013 | Hilt et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,695,077 B1 | 4/2014 | Gerhard et al. |
| 8,755,376 B2 | 6/2014 | Lawson et al. |
| 8,767,925 B2 | 7/2014 | Sureka et al. |
| 8,806,024 B1 | 8/2014 | Toba Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,964,726 B2 | 2/2015 | Lawson et al. |
| 9,014,664 B2 | 4/2015 | Kim et al. |
| 9,015,702 B2 | 4/2015 | Bhat |
| 9,306,982 B2 | 4/2016 | Lawson et al. |
| 9,307,094 B2 | 4/2016 | Nowack et al. |
| 9,344,573 B2 | 5/2016 | Wolthuis et al. |
| 9,456,008 B2 | 9/2016 | Lawson et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |

(56) References Cited

U.S. PATENT DOCUMENTS

| | | |
|---|---|---|
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1* | 3/2005 | Salame ............ H04L 29/06027 379/265.09 |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |

(56) References Cited

U.S. PATENT DOCUMENTS

| | | |
|---|---|---|
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0143714 A1 | 6/2011 | Keast et al. |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas Erkki et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |

(56) References Cited

U.S. PATENT DOCUMENTS

| | | |
|---|---|---|
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0036476 A1 | 2/2013 | Roever et al. |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0239770 A1 | 8/2016 | Batabyal et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

Complaint for Patent Infringement, *Telinit Technologies, LLC* v. *Twilio Inc.*, dated Oct. 12, 2012.
Kim et al. "In-service Feedback QoE Framework" 2010 Third International Conference on Communication Theory. Reliability and Quality of Service. pp. 135-138. 2010.
Matos et al. "Quality of Experience-based Routing in Multi-Service Wireless Mesh Networks" Realizing Advanced Video Optimized Wireless Networks. IEEE. pp. 7060-7065. 2012.
NPL, "API Monetization Platform", 2013.
RFC 3986: Uniform Resource Identifier (URI): Generic Syntax; T. Berners-Lee, R. Fielding, L. Masinter; Jan. 2005; The Internet Society.
S. barakovic and L. Skorin-Kapov. "Survey and Challenges of QoE Management Issues in Wireless Networks". 2012, pp. 1-29.
Subramanya, et al. "Digital Signatures", IEEE Potentials, Mar./Apr. 2006, pp. 5-8.
Tran et al. "User to User adaptive routing based on QoE" ICNS 2011: The Seventh International Conference on Networking and Services. pp. 170-177. 2011.
Nu et al. "Quality Evaluation in Peer-to-Peer IPTV Services" Data Traffic and Monitoring Analysis, LNCS 7754. pp. 302-319. 2013.
Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.
Archive Microsoft Office 365 Email | Retain Unified Archiving, 2015, GWAVA, Inc., Montreal, Canada. <http://www.gwava.com/Retain/Retain_for_Office_365.php>.
Twilio Cloud Communications—APIs for Voice, VoIP, and Text Messaging, Twilio. <http://www.twilio.com/docs/api/rest/call-feedback>, Apr. 12, 2016.

\* cited by examiner

METHOD AND SYSTEM FOR A MULTITENANCY TELEPHONE NETWORK

CROSS-REFERENCE TO RELATED APPLICATIONS

This application is a continuation of co-pending U.S. patent application Ser. No. 14/626,427, filed 19 Feb. 2015, which is a continuation of U.S. patent application Ser. No. 14/158,281, filed 17 Jan. 2014, now issued as U.S. Pat. No. 8,995,641, which is a continuation of U.S. patent application Ser. No. 13/632,872, filed 1 Oct. 2012, which is a continuation of U.S. patent application Ser. No. 12/716,127, filed 2 Mar. 2010, now issued as U.S. Pat. No. 8,315,369, which claims the benefit of U.S. Provisional Application No. 61/156,758, filed 2 Mar. 2009, U.S. Provisional Application No. 61/249,493, filed 7 Oct. 2009, and U.S. Provisional Application No. 61/296,270, filed 19 Jan. 2010, all of which are incorporated in their entirety by this reference.

This application is related to prior application Ser. No. 12/417,630, filed 2 Apr. 2009, which is incorporated in its entirety by this reference.

TECHNICAL FIELD

This invention relates generally to the telephony field, and more specifically to a new and useful multitenancy telephone network in the telephony field.

BACKGROUND

A telephone network has historically used a channel architecture for a telephone session or connection. This channel architecture has a foundation in the history of telephony; a physical wired connection or channel needed to be physically connected to make a telephone call. The concept of channels is still used today. Subscribers to a telephone network are conventionally required to pay on a per channel basis. Users that wish to have a public branch exchange ("PBX"), call center, or similar telephony application typically subscribe to a service and have a fixed number of channels that are available to them and only them. As the number of channels is part of their contract, they cannot exceed that number of channels (or else the call or telephone session will fail). Since most applications only see full capacity usage on rare occasions, the user often pays for more channels than are typically used.

In contrast to the channel based architecture of the telephone network, packet based network innovations have seen a rise in recent years, such as voice over internet protocol (VOIP), internet based applications, and internet-based telephony applications. With newer technology coming to the telephony field there are unique challenges arriving for handling the hardware and software capacity demands. Dedicated hardware and software often perform tasks during a telephone call session or even act as an intermediary system for connecting a caller to an internet based application. Telephone systems generally have higher performance expectations than a website based application. While a user of a website expects a website and software to take time to load and process information, a caller experiences frustration in delays or unresponsive interactions while on the phone. Additionally, the telephony applications are still dependent on the channel based telephone system, which adds yet another barrier to scalability. The telephone network and existing telephone application software and hardware architecture limit the growing capabilities of the telephony application field. Thus, there is a need in the telephony field to create a new and useful multitenancy telephone network. This invention provides such a new and useful system and method.

OBJECTS OF THE INVENTION

The present invention provides a system and method for providing a multitenancy telephone network for telephony applications. One objective of the present invention is to manage shared resource usage in a multi-user environment and to dynamically scale resources to satisfy capacity requirements. A related effect of this objective is that the sum total of the apparent number of resources available to each user is greater than the actual number of resources used to implement the multi-tenant telephone network. Another objective of the present invention is to efficiently use resources of a telephony platform by provisioning the processing and storage resources to satisfy capacity requirements, effectively leaving other unused resources for alternative applications, powered off for power saving, or any suitable functions. Another objective of the present invention is to make the use of a cluster of telephony resources transparent to an application of a user. This transparency is preferably preserved despite situations where operation of an application is distributed between a plurality of telephone service resources and may involve a plurality of telephone sessions on different channels. These and other objects of the invention are accomplished by the preferred embodiments of the invention, including a system for multitenancy telephone network, a method for operating a multitenant telephone network, a method of operating a dynamic telephone network, and a method of distributing calls between telephone hardware, each described in the following sections.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for a Multitenancy Telephone Network

Figure 2:
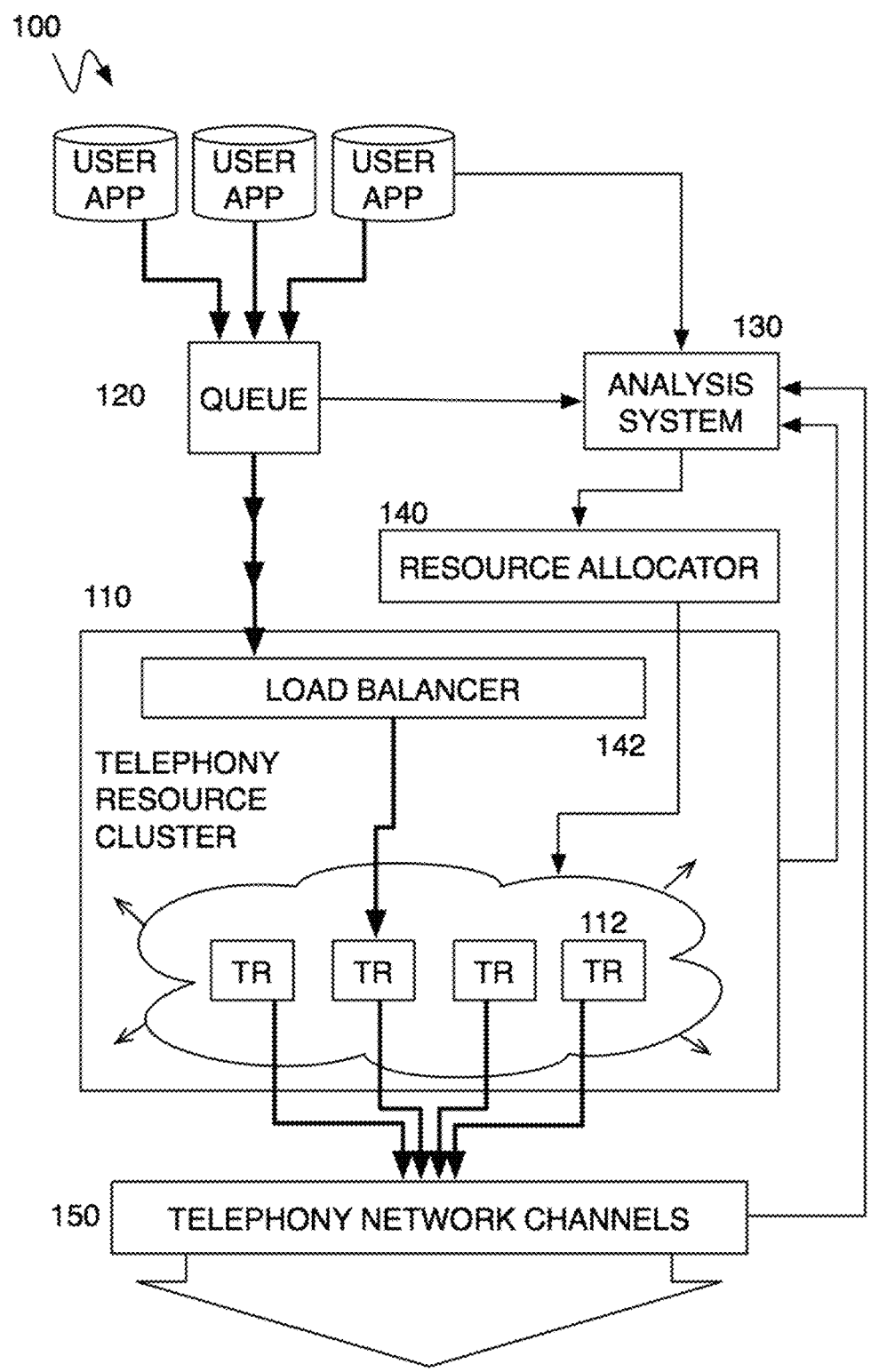
FIGS. 2-4 are schematic representations of preferred embodiments of a system for a multitenancy telephone network.
Figure 3:
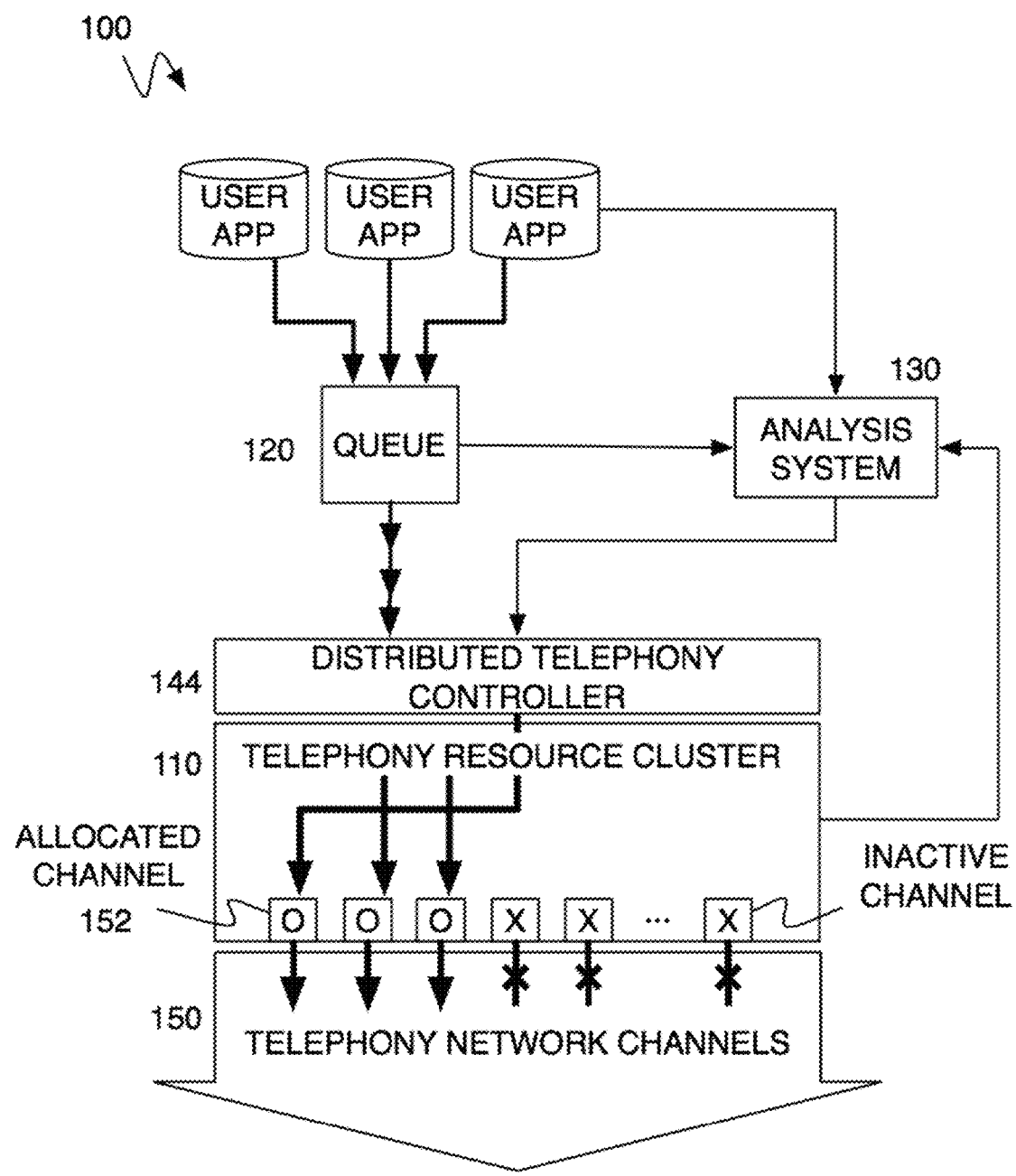
Figure 4:
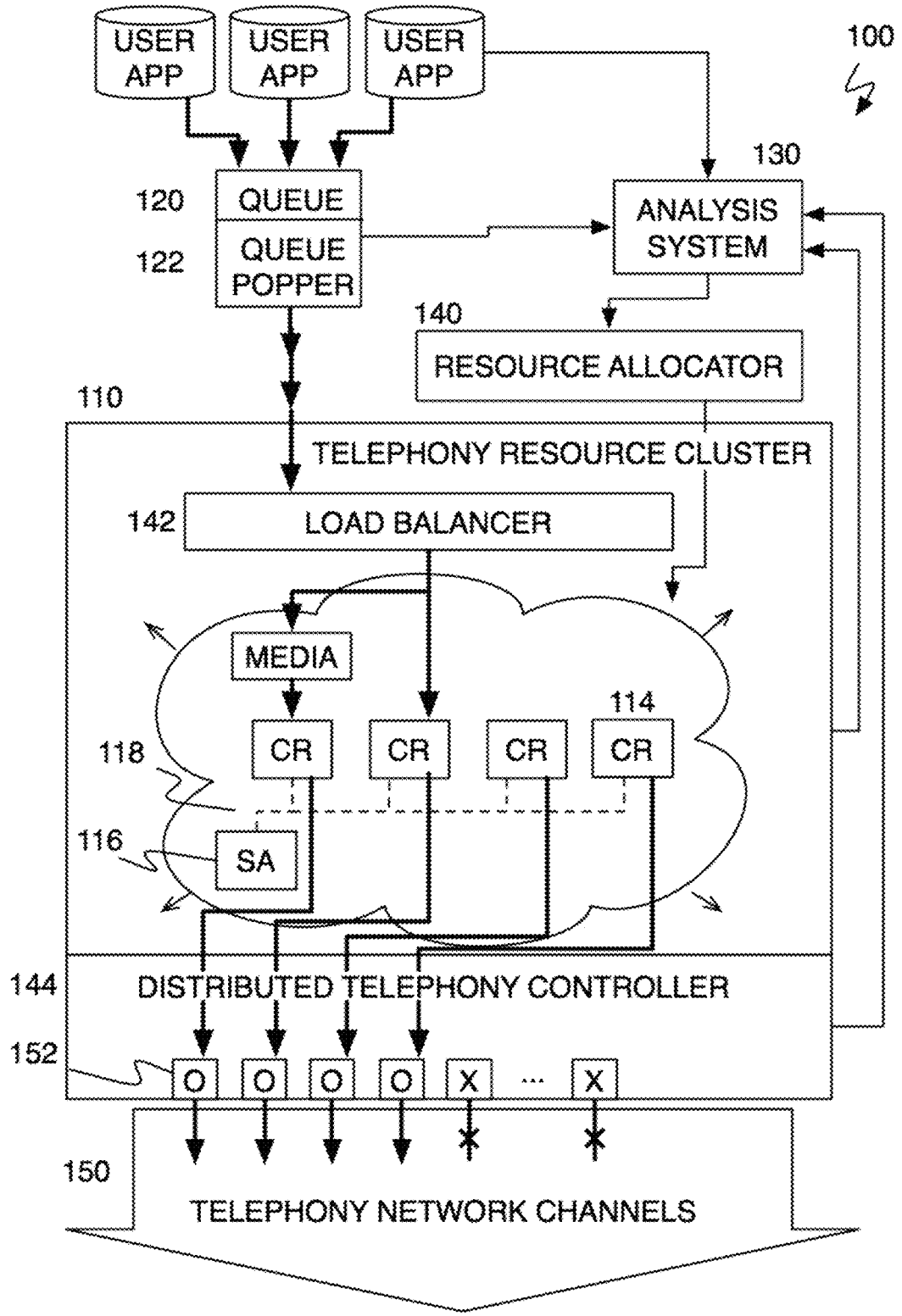

As shown in FIGS. 2-4, the system 100 of the preferred embodiment includes a telephony resource cluster 110, a call queue 120, an analysis system 130, a resource allocator 140, and a plurality of telephony network channels 150. The telephony resource 110 cluster preferably includes a plurality of allocated telephony network channels 152 and/or a plurality of telephony resources 112 such as a plurality of call routers, a load balancer, and may additionally include a service application. The system functions to distribute the use of the network and system resources and dynamically adjust the system based on capacity requirements.

The telephony resource cluster 110 (or "cluster") functions as a scalable (expandable and/or contractible) collection of resources, where at least one resource is used to create a phone call session requested by a user. The cluster 110 is preferably a collection of hardware and/or software components that can dynamically adjust to satisfy processing and/or storage requirements. The cluster 110 preferably appears as a hardware and/or software cloud to outside devices, such that management of hardware allocation and usage is handled internally by the system. In one variation shown in FIG. 2, the telephony resource cluster 110, is preferably a plurality of telephony resources 112 which functions to provide intermediary processing tasks for a call request or call session, such as establishing a call session, converting telephony instructions into call actions, transcribing a call, or directing a call. In another variation shown in FIG. 3, the telephony resource cluster 110 is preferably a plurality of connections to allocated telephony network channels 152, where an allocated telephony network channel 152 is a channel of the allocated telephony network channels 152 that has been activated or designated as a channel available for a call session.

The telephony resources 112 are preferably software or hardware resources that are provisioned for a particular telephony processing task. There are preferably a plurality of telephony resources 112, and there may be a plurality of types of telephony resources that perform different dedicated tasks. A telephony resource 112 preferably includes a computer processors and/or computer storage devices. The telephony resource 112 may be a physical hardware device, virtual machine, a software program/routine, and/or any suitable combination to provide the processing and storage operations of a telephony resource 112. In some cases, a telephony resource 112 may include dedicated hardware or software. Since the telephony resources 112 share the basic functionally as either processing power or data storage, the core functionality of a telephony resource 112 may be reprovisioned such that the telephony resource 112 performs a different dedicated task. The resource allocator 140 (and more specifically the load balancer 142) preferably reprovisions telephony resources 112 to act as different parts of the resource cluster 110. For example, the cluster may include a number of text-to-speech servers and a number of call routers, but at some point in time there may be a low number of text-to-speech operations being performed and an increased number of telephony applications, and so a text-to-speech server is preferably reprovisioned as a call router. In one variation, the plurality of telephony resources 112 (i.e., the cluster 110) preferably includes a plurality of call routers 114. Additionally or alternatively, the cluster may include other hardware devices or software instances such as media processing systems, transcription systems, text-to-speech systems, call recorders, call data storage, or any suitable hardware (physical device or virtual machine) or software. The resource allocator 140 for the cluster preferably includes a load balancer 142 that manages the distribution of processing tasks and the operation of the plurality of telephony resources 112. Additionally, the cluster may include a service application and/or a call router network that can cooperatively resolve issues that result from using a plurality of resources.

Figure 5:
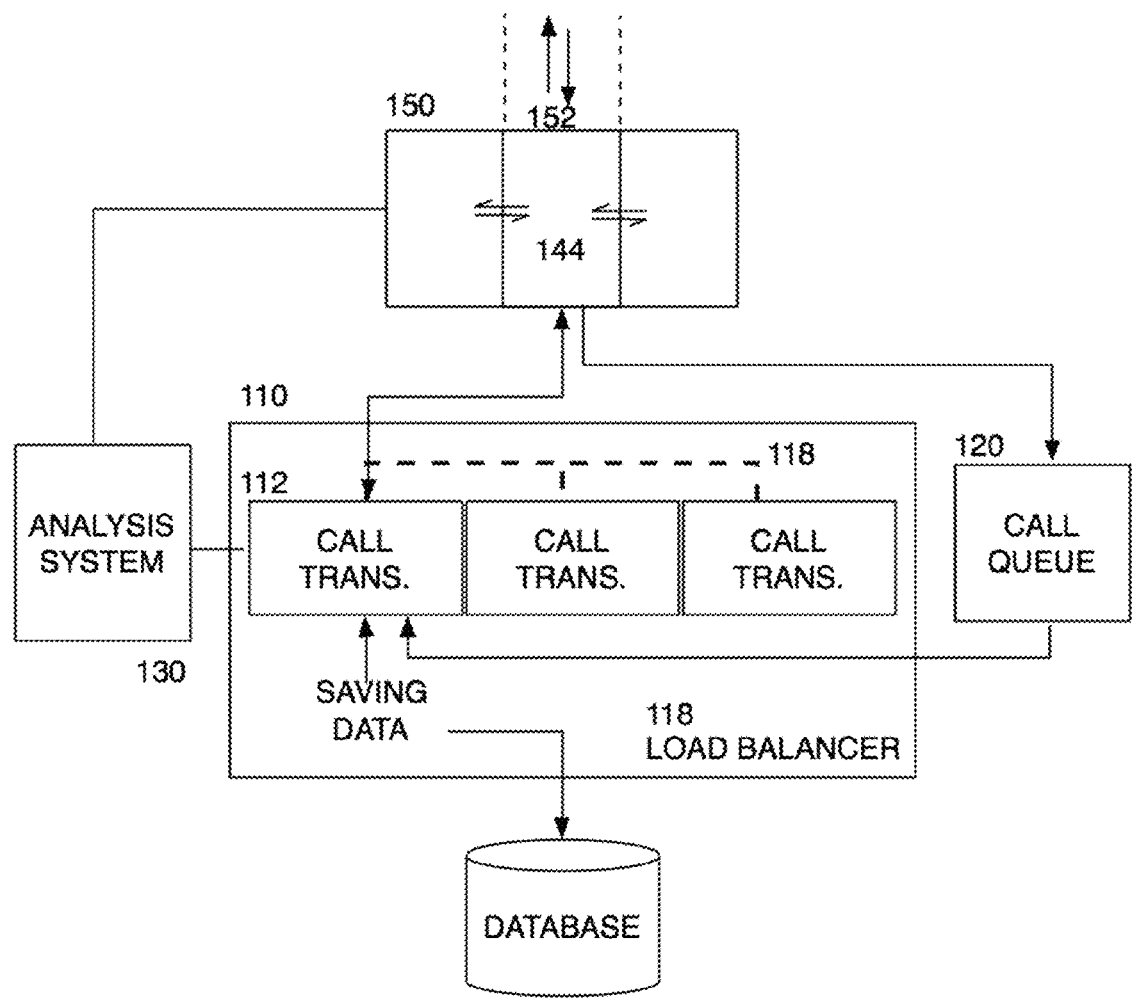
FIG. 5 is a schematic representation of a preferred embodiment of the invention using a cluster of call transcribers.

The plurality of call routers 114 functions to initiate or receive calls from telephony devices and provide telephony application related processing. Preferably, the call routers connect to an application server, which is preferably the source of the call request. The plurality of call routers 114 is preferably a dynamic number of call routers 114 that can be adjusted according to capacity requirements. As stated above, in alternative embodiments the plurality of call routers 114 may be replaced by or combined with other suitable telephony hardware or software resources such as media processing systems, transcription systems, text-to-speech systems, or other specialized hardware or software resources that are used in a telephony application. In one example, a plurality of transcription hardware or virtualized resources may be used in place of call routers for transcribing phone calls, as shown in FIG. 5. Additionally, a call router 114 may be reprovisioned as a media processing system, transcription system, text-to-speech system, or for any suitable process, and similarly any processor may be reprovisioned to serve as a call router. The number of hardware or software resources may additionally or alternatively be allocated or deallocated so that any desired number of resources in any suitable combination may be operated at any time. A hardware instance may be powered down, put into energy saving mode, or placed in any suitable state when deallocated. The telephony resources 112 may additionally or alternatively be operated as virtualized resources on a cloud computing platform (which may be operated by an outside party such as Elastic Compute Cloud operated by Amazon). When a telephony resources 112 such as a call router 114 is deallocated the virtualized resources may be returned to the vendor, given to other customers of the cloud computing platform, ending the virtualization of the resources, or any suitable process. A software instance may be quit or deleted when deallocated. The ratio of resources, such as the ratio of call routers to media processing systems, may be adjusted or maintained.

A call router 114 is preferably connected to a Public Switched Telephone Network (PSTN) device over the PSTN network, such that it can receive and make calls from PSTN-connected devices, such as landlines, cellular phones, satellite phones, or any other suitable PSTN-connected devices, as well as non-PSTN devices, such as Voice-Over-Internet-Protocol (VOIP) phones, SIP devices, Skype, Gtalk, or other Internet addressable voice devices. Thus the call routers 112 can preferably create connections to the telephone network of the distributed telephone controller. The call router 112 may alternatively or additionally function as or include a message router for use with telephony messaging such as SMS (Short Message Service) messages or MMS (Multi Media Messaging). The call router 112 can preferably connect to a messaging network, such that it can receive and send messages from SMS/MMS network devices, cellular phones, computers, smartphones, or any suitable SMS/MMS network devices. The call router 112 may also send or receive text messages, multimedia messages, emails, faxes and other suitable PSTN-compatible communication messages. The call router 112 preferably communicates with the application server using an application layer protocol, more preferably using the HTTP (Hypertext Transfer Protocol), or secure HTTPS (Hypertext Transfer Protocol Secure), protocol. The application server preferably hosts a telephony application, sound file, text file, a database, and/or any suitable media, resource or file that can be used by the call router for telephone interactions. The call router 112 may additionally generate call router resources. The call router resources are preferably accessible by the application server and other devices (such as other call routers) through a call router API. The call router resource functions as an addressable representation of call router meta-data, internal call router state, or the state of a given resource used by the call router. For example a call router 114 may record a call and save the recording as a call router resource.

Additionally, the telephony resource cluster 110 of the preferred embodiment may include a service application 116 that functions as a messaging component to coordinate functionality of an application that has been distributed across various call routers 114, hardware resources, and/or software resources. The service application 116 is preferably an internal resource that is used when normal operation of an application is prevented because the operation of an application is distributed amongst various hardware and software resources of the cluster 110. The service application 116 is preferably a messaging service that offers reliable messaging where a message is delivered to a particular destination (such as to another call router 114). The service application 116 may alternatively offer broadcasting messaging that announces a message without knowing who receives a message of if the message was received. As a first example, a hang-up service application 116 may be used to coordinate hanging up call sessions on different call routers 114. The hang-up service is preferably used to communicate to the appropriate call routers 114 to cancel outgoing calls when, for example, an application wants to dial a plurality of numbers but then hang up all unanswered calls once one of the calls is answered. As a second example, a multiple input service may gather and input commands from multiple telephone devices. So dual-tone multi-frequency (DTMF) input or voice commands may be issued by any caller and communicated to the application even if the calls are distributed over multiple call routers 114 within the cluster. This may be used in voting applications within a conference call. In this way, a telephone application does not need to actively account for processing and call handling being distributed within the cluster, and the hardware and software resources of the cluster preferably appear as a single entity to outside applications because of the internal service applications 116.

Additionally, the telephony resource cluster 110 of the preferred embodiment may include a call router network 118 that functions to allow a level of communication and synchronization between various call routers 114. The call router network 118 may additionally or alternatively be applied to other hardware or software resources. The call router network 118 is preferably used to access shared resources or as a communication channel. In one exemplary application, a voice over internet protocol (VOIP) connection is established over the call router network 118 for mixing audio from various call routers. The VOIP connection is preferably used in implementing conference calls distributed over multiple call routers 114. As another example, the call router network 118 may additionally be used to stream audio from a call router to a realtime internet audio stream. As another example, the call router network 118 may be used to access data on another telephony resource 112 such as by using the call router API to access a call router resource. The service application 116 and the call router network 118 may additionally cooperate in synchronizing applications distributed within the cluster.

The call queue 120 of the preferred embodiment functions to manage a stack of call requests. The call queue 120 is preferably a list of outbound call requests that have not been serviced or been assigned necessary resources. The requests are preferably serviced at a rate suitable for the current capacity of the network 150 and telephony resource cluster 110. The servicing rate may alternatively be adjusted according to the capacity of the distributed telephony controller 144, the telephony resource cluster 110, and/or number of requests in the queue 120. A call request (such as one made by a telephony application) is preferably placed in the call queue 120 when capacity is exceeded or alternatively placed in the call queue 120 for every request or based on any suitable rule.

Figure 6:
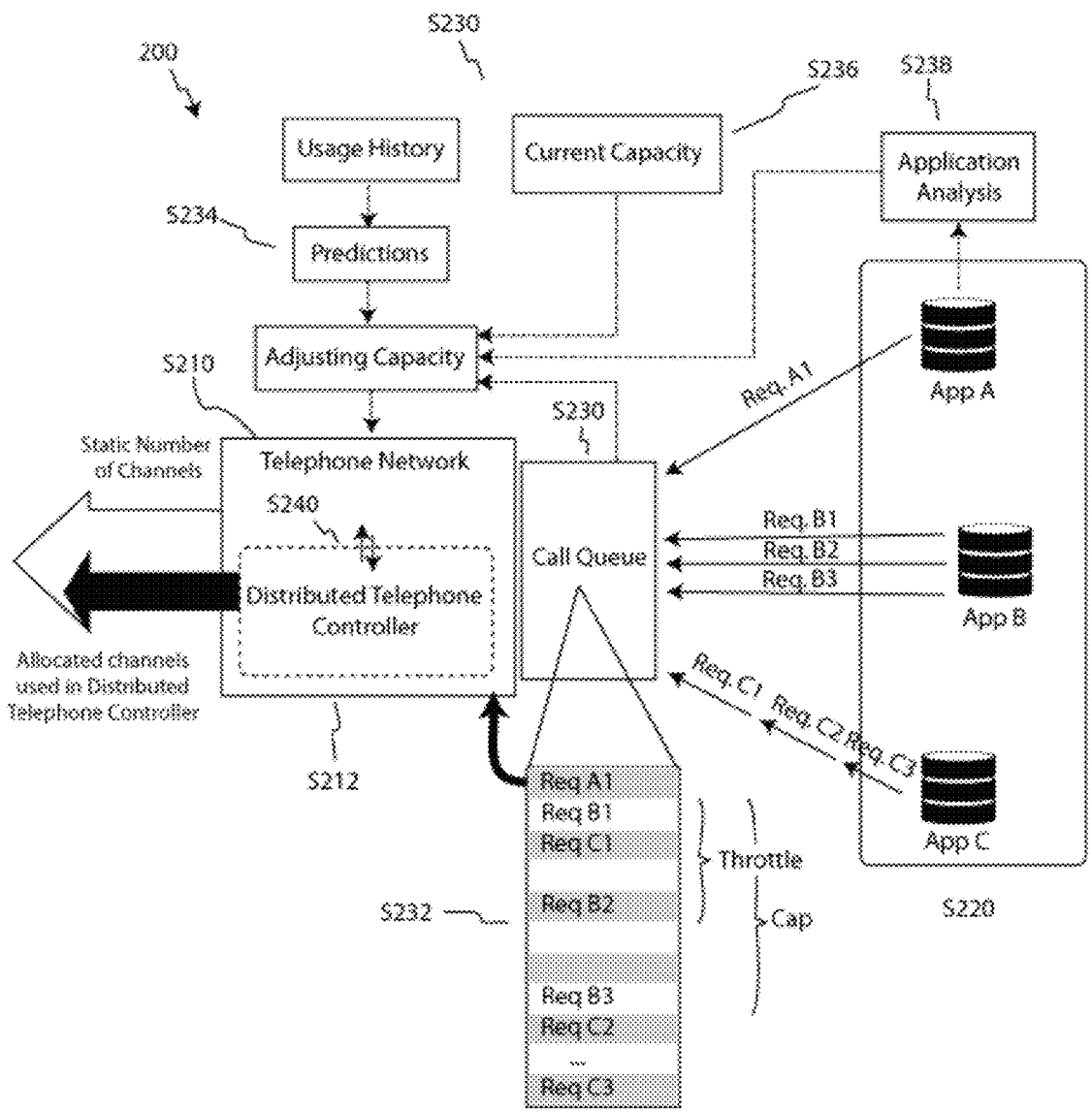
FIG. 6 is a flowchart of a preferred embodiment for the method for operating a dynamic telephone network.

In one variation, an application preferably has associated user limits, in particular: an inter-call request rate limit (throttle) and a total limit (cap). The throttle and cap are preferably used to determine the positioning of requests in the call queue. The limits may alternatively be assigned to an account, phone number, or any suitable entity. Telephony messages (e.g., SMS or MMS) are one variation of a call request that can additionally be placed in the call queue. Inbound and outbound telephony message can preferably be queued because inbound messages do not require immediate action unlike inbound calls. The SMS message is preferably sent after the request is serviced in the queue. SMS messages and/or MMS messages may alternatively be queued in a dedicated message queue. SMS message may have a rate limit (throttle) and total limit (caps) that varies from requests. Requests received at any rate from a user are preferably spaced in time in the call queue according to the throttle. There is preferably a latency enforced between call requests from an application. Requests of different users are preferably ordered in the queue in a staggered or alternating fashion as shown in FIG. 6, but alternatively, users may have priority based on a service plan, first-come-first-serve policy, type of call request, and/or any suitable policy. The cap is preferably a limit on the total number of requests a user can make in a given amount of time. The user limits, handling, spacing, and/or ordering of the call queue 120 function to prevent one application from unfairly dominating the usage of the telephone network 150 or telephony resource cluster 110 at any one time. Additionally, applications may request access to telephony resources 112 as soon as possible or at some time in the future (e.g., a user schedules a call or calls for a later time). Additionally or alternatively, the user limits may be adjusted or set according to the needs of an application. An application may have particular requirements based on the nature or characteristics of the application of the user. The user limits are preferably set according to the contract and/or pricing model that a user selects or by any suitable means.

In another variation, the call queue 120 is dedicated to requests of a single user entity. In this variation, there is preferably a plurality of individually assigned call queues 120. Call requests are preferably organized into a call queue 120 for each user. Telephony message requests alternatively have a queue for each phone number. A user requests can preferably be added to the individually assigned queue 120 at any time. Each queue is preferably serviced (i.e., dequeued) on a schedule that considers the per-user limits (such as resource limits, system-wide limits, etc.). In other words the dequeuing occurs in an alternating fashion between the plurality of call queues 120. The individually assigned call queues may additionally be for particular resources, and the dequeuing preferably occurs according to the dequeuing rate of the particular resource. The dequeuing rate is preferably related to the capacity of the resource but may alternatively be based on any suitable criteria. As with the other queuing variations, queuing may alternatively occur according to any suitable queuing methodology such as randomly, in a round-robin fashion, with fair queuing, with weighted fair queuing, based on actual resource utilization, and/or any suitable methodology. As an alternative to queuing based on account/phone number, call or message requests may be queued based on time, priority, usage history, or any suitable aspect. There may additionally be a control queue used to coordinate the dequeuing of individually assigned call queues (or message queues) 120.

As mentioned above, the call queue 120 may include an additional or alternative system for handling telephony messages (e.g., SMS or MMS messages). SMS messages preferably have additional limitations on their servicing rates and restrictions. SMS messages are preferably not only queued for sharing telephone network access with various users, but rates are also preferably implemented to prevent SMS messages from a single user from being rate limited, identified as spam. A call queue 120 for telephony messages may include at least two types of queues: a control queue and a phone number queue. The phone number queue preferably functions as a personal queue of a single user for telephone messages the user wants to send, and the control queue functions substantially similar to the multi-user queue described above for the call queue 120. The individually assigned call queue 120 may alternatively be used without the control queue, and the individually assigned call queue 120 may be based on account phone number or any suitable assignment. The control queue and phone number queue preferably functions to isolate the queuing of messages for a particular application and the messages of the plurality of messages. The content of the SMS message (the text) or MMS message (the multimedia) is preferably not stored in the call queue directly, and a reference to the SMS message content is preferably stored. This functions to reduce the load on the queue. The SMS/MMS content is preferably stored and accessed when the queued reference is serviced.

A queue popper 122 (i.e., a dequeuer) is preferably a software or hardware mechanism that functions to select call requests to service from the call queue The queue popper 122 preferably selects call requests at a preferred rate, but the queue popper 122 may alternatively select calls requests according to capacity or available resources, or a combination thereof. There may additionally be a plurality of queue poppers 122 that function to simultaneously select call requests from the call queue 120. The number of call poppers 122 may be variable. Additional or special queue poppers 122 may be used for the additional SMS call queues. The call queue(s) 120, the queue popper(s) 122, or any suitable combination are preferably used to control the throttling (or servicing rate) of the call requests. The throttling may be performed on a per-phone number, per-account (as in a multi-tenant application), and/or according to any call/message attribute.

The analysis system 130 of the preferred embodiment functions to analyze the system to predict resource requirements. The analysis system 130 preferably monitors a plurality of aspects of the system. The analysis system 130 may monitor the current capacity such as network or hardware operation levels or trends (increasing or decreasing); usage history such as logged data to find correlations in capacity (e.g., detecting patterns); queue length and queue entry latency; analysis of applications such as historical patterns from past usage of an application; and/or any suitable aspects. Patterns in capacity needs are preferably found related to the time of day, day of the week, yearly patterns, usage patterns (such as if an increase in capacity needs by one user indicates increase in capacity needs by other users), call location, call duration of calls, and/or any suitable indicator. The analysis system 130 preferably makes distinctions between inbound and outbound capacity for telephone network channels. The analysis system preferably generates data for the resource allocator 140, a distributed telephone controller 144, a load balancer 142, and/or additionally the call queue 120. The predictions or data from the analysis system may additionally be used for provisioning capacity of the distributed call controller, planning capacity requirements of the static capacity of the telephone network, the number of call routers, hardware or software resources within the cluster, and/or parameters of queue management. The analysis system 130 preferably compares expected and actual load, and provides data that is used to compensate for the variability in utilization of resources of the system.

The resource allocator 140 of the preferred embodiment functions to scale and manage the operation of the telephony cluster 110. The resource allocator 140 additionally preferably reprovisions telephony resources 112 of the cluster 110, allocates new telephony resources 112, deallocates telephony resources, and/or any other suitable allocation process. The resource allocator 140 may additionally control the provisioning of call queues and other devices of the system. The resource allocator 140 preferably uses data of the analysis system 130 in determining the provisioning and operation of resources. The resource allocator 140 preferably uses information from the analysis system 130 to predict required telephony resource 112 capacity. The resource allocator 140 preferably uses the predicted capacity requirements to determine how many hardware (physical or virtualized) or software resources need to be operating, and the resource allocator preferably allocates, deallocates, or reprovisions telephony resources 112 (e.g., call routers and/or other hardware or software resources) as necessary. The resource allocator 140 may additionally use startup time, operation cost, or other parameters of hardware and software resources when determining the number and ratio of resources to have allocated at a particular time. The resource allocator 140 also preferably keeps track of the quantity of resources currently available, and makes resource availability information available to other system components, including dequeuers, load balancers etc. Such resource availability information is preferably used by other system components to adjust operation of the system components. The resource allocator 150 preferably monitors the resources and reprovisions resources in real time.

The resource allocator 140 of the preferred embodiment preferably includes a load balancer 142 that functions to distribute processing tasks amongst the call routers and other hardware. The load balancer 142 of the preferred embodiment preferably optimizes the distribution of processing tasks such that the plurality of call routers 114 is operated at or near an optimal level. The operation of the call routers 114 may be optimized for performance, energy, cost, and/or any suitable conditions. The load balancer 142 preferably directs tasks (e.g., servicing of call requests/sessions) to appropriate call routers 142 (or telephony resource 112) as the tasks are created. A task is preferably an operation of a telephony application, but may alternatively be a call request or call session. In one example, one hundred call routers 114 may provide the call router tasks for one hundred telephony applications. In a second example, one hundred call routers 114 may each handle a single call session associated with one telephony application, such as for a conference call application with one hundred participants. The resource allocator 140 preferably sends notifications as to the current status of resources of the system (the load of resources, the number of resources, etc.) to the load balancer 142. The load balancer 142 distributes requests to currently available and running resources matching the requirements of the application being load balanced, based on data provided by the resource allocator 140.

The resource allocator 140 of the preferred embodiment may include a distributed call controller 144 that functions to controls usage and operation of the telephone network 150 by the system. The distributed call controller preferably manages the shared usage of the telephone network channels 150 by the plurality of telephony resources. The distributed call controller 144 may alternatively be a subset of multiple telephone networks if multiple network providers or carriers are used. The operation of the distributed call controller 144 preferably functions to operate an allocated number of channels for current capacity requirements of the telephone network 150. The allocated channels are preferably channels within the available static channel capacity that are in use or prepared for use. The distributed call controller preferably has less than or equal capacity as the static channel capacity at any given time. The capacity of the distributed call controller 150 can preferably be increased by allocating more resources of the telephone network to the call controller, and the capacity of the distributed call controller 144 can preferably be decreased by deallocating resources of the telephone network. As an example, a commodity hardware node may be added to the telephone network to run a telephony software stack during high capacity requirements. The distributed call controller 144 preferably uses the analysis system 130 to predict or respond to the desired capacity requirements. The telephone network 150 may additionally be divided into inbound channels, outbound channels, and bidirectional channels that can be used for receiving calls, making calls, and both, respectively. The telephone network 150 may further include SMS or MMS inbound and outbound channels. The distributed call controller 144 preferably manages the usage of the type of channels according to predicted usage. The bidirectional channels are preferably used for flexibility in capacity requirements. As one example, if inbound call load is expected to be high, then outbound calls are preferably directed to outbound channels to leave more capacity for inbound calls. The distributed call controller 144 may additionally manage the number and usage of allocated channels according to subscription or contracts from network providers. Channels may be used allocated or deallocated to ensure that volume pricing thresholds or other network conditions are satisfied.

A telephone network with a static number of channels 150 is preferably the base infrastructure for providing users with telephone network access. Telephony sessions are preferably communicated over the telephone network and the telephony sessions preferably include telephony voice sessions and/or text/media messaging (telephony messaging). The static number of channels is preferably the total number of concurrent telephony sessions or calls that can be supported at one time. The number of channels is typically limited by the number of interconnections available to a specific carrier or network. The telephone network 150 may alternatively be composed of multiple carriers or network providers or the Public Switched Telephone Network, but the plurality of carriers or networks is preferably managed or handled as one telephone network. The static number of channels is preferably a set number for a period of time (usually based on a contract with a telephone company), and the number is preferably large enough to provide sufficient capacity. The static number of channels preferably determines the capacity of a network and the ability of the telephone network to connect with other networks. The operation of the telephone network is preferably handled by providing applications access to a channel of the telephone network. The telephone network may have a given number of channels not being used at any given time. In one variation, the telephone network may alternatively operate unused channels in an unused-mode. The unused mode may be a full or partial hardware power down mode, a hardware sleep mode, a secondary use (such as for non-crucial uses that can preferably be interrupted with minimal adverse effects), and/or any suitable way. The unused mode would function to reduce operation cost and/or maximize the utility of unused capacity. The telephony network channels 150 are preferably Public Switched Telephone Network (PSTN) connections but may alternatively be Session Initiation Protocol (SIP) trunks or any suitable device to create a telephony network connection to a telephony device.

2. Method of Operating a Multitenant Telephone Network

Figure 1:
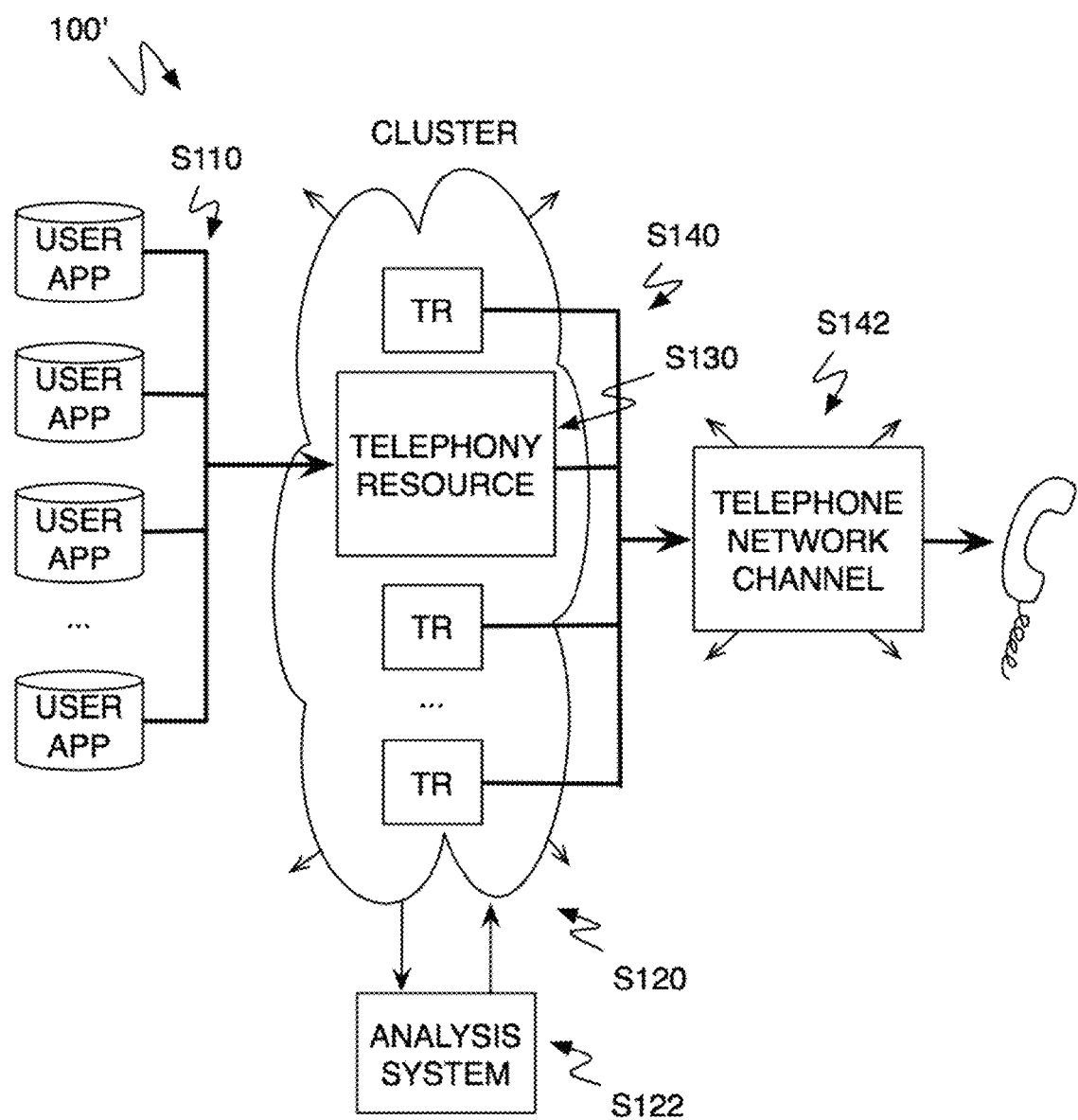
FIG. 1 is a flowchart representation of a preferred embodiment for the method of operating a multitenant telephone network.

As shown in FIG. 1, the method 100' of operating a multitenant telephony network of the preferred embodiment includes the steps of multiplexing call requests of a plurality of users to a telephony resource S110, creating a first call session from the call request through the telephony resource S130, and multiplexing the call session with a plurality of additional call sessions to a telephony channel S140. The method 100' functions to create an efficient and scalable network system for resource intensive telephone applications. The telephony resource is preferably part of a telephony resource cluster. The telephony resource cluster preferably scales to satisfy immediate capacity demands which functions to reduce operation cost and allow a wide variety of applications to use the multitenant telephony network due to the ability to handle a wide spectrum of network loads. Additionally, the method 100' functions to allow the operation of a telephony application to be distributed between a variety of multi-user, shared resources (e.g., a telephony resource) such that the specific goals of telephone applications are not limited by the multitenant telephony network. The method 100' of the preferred embodiment is preferably implemented by a system described above, but may alternatively be implemented by any suitable system.

Step S110, which includes multiplexing call requests of a plurality of users to a telephony resource, functions to share the use of a telephony resource between a plurality of users. A single telephony resource is preferably shared between a plurality of users/applications. The multiplexing preferably occurs in a form of time division multiplexing in which call requests are sent to telephony resource in an alternating fashion. The time division multiplexing is preferably based on completion of complete call sessions or processes. In other words, users take turns using the telephony resource to create a call session and run an application. For example, a first customer preferably has a call request serviced by a telephony resource and upon completion of the call session of the call request, a second user may have a call request serviced by the same telephony resource. A call request is preferably received from a user or more specifically a telephony application residing on an external server, but the call request may alternatively be sent from any suitable source. The call request is preferably received over a packet-based communication channel, in other words a non-direct communication channel. In one variation, the call request is preferably received in a HTTP or HTTPS message but may alternatively be received through any suitable application communication protocol. Step S110 may additionally include queuing a call request of a user S112, which functions to gate or prioritize incoming call requests. The call queue is preferably used for outbound requests, while inbound calls are preferably handled immediately (or else the call session will most likely fail). Alternatively, an inbound call may be queued for full service, with a "ringing" audio played back while call is waiting in the queue to be fully serviced. A queue may, however, be used for inbound telephony messages because telephony messages such as SMS messages and MMS messages will be resent if not received on the first attempt. The call queue is preferably a list of pending call requests from a plurality of users. An additional queue may additionally or alternatively be used for telephony messages. The call requests are preferably ordered within the queue in a way that balances access to resources. Each user (e.g., account, application, or phone number) is preferably assigned an inter call request limit (a throttle) and a limit on the maximum number of call requests that can be made in a specified amount of time (a cap). Call requests are preferably selected for servicing at a specified rate or by a device (i.e., a queue popper), which may be selecting calls based on current load on the telephony resource cluster. The queue may alternatively be operated in any suitable variation such as those described above. A queue may be assigned to each user or phone number. Queuing may alternatively occur according to any suitable queuing methodology such as randomly, in a round-robin fashion, with fair queuing, with weighted fair queuing, based on actual resource utilization, and/or any suitable methodology. A load balancer preferably distributes call requests to a telephony resource that has the least capacity. The load balancer and the call request queue preferably cooperatively distribute the load as described above.

As an additional step, method 100' preferably includes provisioning resources of the telephony resource cluster S120, which functions to scale the capacity of the telephony resource cluster to adequately multiplex a call request to a telephony resource. Step S120 may include reprovisioning an existing telephony resource of the telephony resource cluster, allocating additional resources to the telephony resource cluster, and/or deallocating resources of the telephony resource cluster, and/or re-allocating resources from one type of resource to another in realtime. The telephony resource cluster preferably includes a plurality of telephony resources performing various functions or operations as described above. For example, the telephony resource cluster may include a plurality of call routers, transcription systems, media processing systems, and text-to-speech systems. A telephony resource preferably is composed of a computer processor and/or storage resources for a first purpose. As part of S120, a resource of the telephony resource cluster a processor and/or storage device of a telephony resource is preferably reprovisioned for a new second purpose. For example a text-to-speech may be reprovisioned to function as a call router at times when more calls need to be served. Additionally, more resources may be allocated or deallocated which may include adding new resources to the system and/or activating resources, or re-allocating resources from another customer of a shared resource environment. The resources are preferably those provided by a multitenant shared virtualized computing environment such as a cloud hosting provider (i.e., a web service that provides resizable compute capacity that allows a user to boot a machine image to create a virtual machine resource), but may alternatively be physical machines either co-located or distributed. For example, a number of resources may be operating in a powered down state. When the more capacity is required, the resources may be turned on/booted (i.e., allocated) to serve as a new resource of the telephony resource cluster. Similarly, when the telephony resource cluster has more capacity than is currently required a resource may be powered down, returned to a pool of resources for use by other companies (i.e., deallocated), or any suitable action to end current use of the resource.

Additionally, Step S120 may include analyzing resource capacity requirements S122 which functions to collect data on real-time or imminent capacity requirements. Data may be collected from the call request queue, from stored history on capacity requirements, current load of the telephony resource cluster, data from an analysis of applications, or any suitable source of predicting capacity requirements. Data from the call request queue may provide information such as number of pending call requests, the type or details of the call request, or any suitable queue related information. Stored capacity history preferably provides insight to capacity patterns such as temporal patterns throughout the day, week, or year. Current load of the telephony resource cluster preferably provides information such as the current number of resources of the telephony resource, number of available resources of the telephony resource, the division of type of resources, the number of deallocated resources, the number of telephone network channels, etc. Application analysis data preferably is data from the telephone applications of users on expected or predicted capacity requirements. An analysis is preferably performed on the operation of the application and or gathered from a user on the expected capacity requirements of the application such as number of calls, peak time for calls, what type of calls (e.g., conference calls, SMS messages etc.). The analysis information is preferably used to control the provisioning, allocation, and deallocation of resources of Step S120. Additionally, after analyzing the capacity requirements, other components of the system such as the telephony resource cluster, telephony resources, call queue, dequeuers, resource allocator are preferably notified of relevant analysis information. Particular analysis information may be specifically sent to a component. For example, the load balancers and the dequeuers are preferably informed about available resources and adjust operation according to the capacity information.

Step S130, which includes creating a first call session from the call request through the telephony resource, functions to convert the call request into a call session using the telephony resource. Step S130 preferably additionally includes additional processing and steps specific to a particular application. In a preferred variation, a call router preferably processes telephony instructions of a call request to identify the destination phone number and then establishes a connection to the destination phone number as part of Step S140. A transcription server may initiate recording or prepare to record a conversation of the call session.

Step S140, which includes multiplexing the call session with a plurality of additional call sessions to a telephony channel, functions to establish a telephone network connection to a telephony device. The telephony channel is preferably a PSTN (Public Switched Telephone Network) connection. This may be a physical wire or some interfacing infrastructure to connect to the PSTN. In some cases the concept of a channel is preferably subscribed to or rented from a telephone network. In one alternative, a SIP (Session Initiation Protocol) trunk may be used as an internet based gateway to a telephone network. The multiplexing preferably occurs in a form of time division multiplexing in which call sessions are connected to telephony channel in an alternating fashion. The time division multiplexing is preferably based on completion of complete call session. For example, a particular network channel may first be utilized for a call session of a first user, and upon completion of the call, a second call session may be established with the particular network channel for a second user. As part of Step S140, the telephony channels may additionally include provisioning telephony channels S142. This functions to adjust the number of available telephone network capacity of the system. By provisioning gateways to the telephone network (e.g., call routers or SIP trunks), channels or gateways to channels may be allocated or deallocated. Such scaling of telephony network channels preferably allows operation near the current telephone network capacity requirements. If such scalability was not in use then there would be a set limit on the number of channels that could be simultaneously used.

3. Method of Operating a Dynamic Telephone Network

As shown in FIG. 6, the method 200 of providing a telephony network of the preferred embodiment includes the steps of operating a telephone network with a static number of channels S210, providing telephone network channel access to a plurality of users S220, and managing usage of channels to allow a user to access a number of channels that exceeds normal operation S230. The method functions to allow the operator of the telephone network to offer high capacity to a plurality of users, without a reduction in quality or reliability of services based on usage. This method is preferably implemented on a system substantially similar to the one described above, but any suitable system may alternatively be used. The method may additionally be used in combination with the methods herein described. The method 200 further functions to allow users to use the telephone network without a specific concern about the number of channels required for operation. The users of the telephone network are preferably operating telephony applications such as call centers, Private Branch Exchanges (PBX), phone trees, telephony phone applications, VOIP services, SMS or MMS services, and/or any suitable telephony application. The operators of the telephone network are preferably a telephone service provider such as a telephony platform provider (e.g., a internet-telephone platform provider), a telephone company (e.g., owners of a telephone network such as AT&T), and/or any suitable party. In a variation of the preferred embodiment, the method 200 may additionally include a distributed call controller, a call queue, and/or the step of assessing capacity requirements.

Step S210, which includes operating a telephone network with a static number of channels, functions to be the base infrastructure for providing users with telephone network access. The static number of channels is preferably the total number of concurrent telephony sessions or calls that can be supported at one time. The number of channels is conventionally limited by the number of interconnections available to a specific carrier or network. The telephone network may, however, be composed of multiple carriers or network providers or the Public Switched Telephone Network, but the plurality of carriers or networks is preferably managed or handled as one telephone network. The static number of channels is preferably a set number for a period of time (usually based on contract with a telephone company), and the number is preferably large enough to provide sufficient capacity. The static number of channels is preferably an indication of the capacity of a network and the ability of the telephone network to connect with other networks. The operation of the telephone network is preferably handled by providing users access to a channel of the telephone network. The telephone network may have a given number of channels not being used at any given time. In one variation, the telephone network may alternatively operate unused channels in an unused-mode. The unused mode may be a full or partial hardware power down mode, a hardware sleep mode, a secondary use (such as for non-crucial uses that can preferably be interrupted with minimal adverse effects), and/or any suitable way. The unused mode would function to reduce operation cost and/or maximize the utility of unused capacity.

As an additional alternative to the preferred embodiment, the method may include operating a distributed call controller as a subset of the telephone network S212. The distributed call controller may alternatively be a subset of multiple telephone networks if multiple network providers or carriers are used. The operation of the distributed call controller preferably functions to operate an allocated number of channels for current capacity requirements of the telephone network. The distributed call controller preferably has less than or equal capacity as the static channel capacity at any given time. The capacity of the distributed call controller can preferably be increased by allocating more resources of the telephone network to the call controller, and the capacity of the distributed call controller can preferably be decreased by deallocating resources of the telephone network. Access to the telephony network is preferably facilitated by virtualized hardware or software (such as call routers or SIP trunks). Allocation of more resources of the telephone network may additionally include a virtualization of a device to access a telephony network. For example a virtualization of a network access channel may be added to add further access capacity to the telephony network. As another example, a commodity hardware node may be added to the telephone network to run a telephony software stack during high capacity requirements.

Step S220, which includes providing telephone network channel access to a plurality of users, functions to allow a plurality of different parties to access the channels of the telephone network. The users preferably subscribe to a service of the operator of the telephone network. The users of the telephone network are preferably operating telephony applications such as call centers, Private Branch Exchanges (PBX), phone trees, Interactive Voice Response (IVR) applications, internet-telephony applications, VOIP services, and/or any suitable telephony application. The user preferably does not subscribe to the service based on any specific number of channels. From the viewpoint of the user, the number of channels is preferably infinite or an irrelevant point for the operation of an application of the user. The user is preferably presented a per usage or time perspective (e.g., pricing and/or application usage perspective), while the telephone network is being operated on a per channel basis. The operator of the telephone network preferably converts costs associated with the operation of the telephone network (e.g. fixed capital costs of leasing from a telephone company or operation cost) into variable costs for the users. The access to the telephone network is preferably operated, leased, and/or on contract from a telephone company (such as AT&T) by a per channel basis. A lease agreement or contract may alternatively be negotiated to minimize per-channel (capacity) cost and preferably emphasize per usage or per time costs, or alternatively, any suitable leasing agreement or contract may be used. Users preferably pay by usage, a flat rate for a time period, per minute, a combination of usage and time charges, and/or any suitable pricing model.

Step S230, which includes managing usage of channels to allow a user access to a number of channels that exceeds normal operation S130, functions to provide high capacity capabilities to users while ensuring that the quality and reliability of the telephone network is not aversely affected by the usage of other users. An individual user of the plurality of users is preferably allowed to use a number of channels greater than an equal division between the plurality of users of the static number of channels. The sum total of the maximum number of channels an individual user uses at given times may preferably be greater than the static number of channels. The given times where an individual user has access a maximum number of channels is preferably when demand on the telephone network by other users is low. Usage of the telephone network and the telephony resource cluster is preferably time based multiplex based on the completion of telephony sessions (i.e., users share the use of the resources and network). In a simplified example, a telephone network has 10 channels available and there are five users. When distributed uniformly, the users would each have 2 channels available for usage, but in one preferred embodiment all five users may have access of up to 10 channels each, assuming no other user is using the channels. During regular use of the telephony network, the user still has the ability to access the maximum number of telephone network channels but the call requests are preferably gated by user limits implemented by a call queue. In another example extending on the above example, analysis might indicate that 4 users may use 2 channels at a given point of time, thus 8 may be available to the 5th user, while keeping capacity available for the first 4 users. Managing the usage of the channels preferably includes managing the usage of resources such as by: managing a call queue, enforcing user limits, predicting and/or analyzing usage and capacity requirements, adjusting capacity based on the capacity of the distributed call controller, and/or any suitable steps of managing the resources of the telephone network. Capacity of the distributed call controller may additionally be controlled or affected by predictions and analysis and user limits may additionally be affected.

The method of the preferred embodiment may additionally include the step of managing a call queue of requests from the plurality of users S232. Step S232 functions to prioritize the handling of call requests from users. The call queue is preferably a program or hardware managed stack that is operated as part of a control architecture of the telephone network. The control architecture preferably manages the telephone network and usage by the plurality of users. The call queue is preferably a list of call requests awaiting service by the telephone network including telephony voice session requests and/or SMS/MMS message requests. The requests are preferably serviced at a rate suitable for the current capacity of the network and for each user. The servicing rate may alternatively be adjusted according to the capacity of the distributed call center or number of requests in the queue. A user request is preferably placed in the call queue when capacity is exceeded or alternatively placed in the call queue for every request or based on any suitable rule. A user preferably has associated user limits, in particular: a call rate limit (throttle) and a total limit (cap). The throttle and cap are preferably used to determine the positioning of requests in the call queue. Requests from a user are preferably spaced in time in the call queue according to the throttle. Requests of different users are preferably ordered in the queue in a staggered or alternating fashion as shown in FIG. 6, but alternatively, users may have priority based on a service plan, first-come-first-serve policy and/or any suitable policy. The cap is preferably a limit on the total number of requests a user can make in a given amount of time. Subsequent requests are preferably schedule for a later time according to the cap, but requests exceeding the cap may be handled in any suitable manner. For example, if user can make one call per second, and the user requests 100 calls, they will be scheduled equally over the next 100 seconds. Note that this cap can be described as the number of calls/time frame (1/second), or the required latency between calls in the queue (1 second). The user limits, handling, spacing, and/or ordering of the call queue function to prevent one user from unfairly dominating the usage of the telephone network at any one time. In the variation of SMS/MMS message requests, the rate of individual users is considered to prevent message filtering by a network. For the SMS/MMS variation the requests may additionally be queued in a control queue and a phone number queue. The contents of the SMS/MMS messages are preferably stored and a reference to the contents of a message is queued which functions to reduce the load on the queue. A plurality of cache servicing ports or pointers are preferably used. The servicing ports are preferably a software and/or hardware control mechanism for operating a call request from the call queue. A servicing port preferably takes a request from the call queue and connects the corresponding user application or user to a telephone network channel. The servicing port may be a direct connection, but may alternatively be a hardware or software resource such as a call router in a cluster as described above. The servicing ports are preferably less than the static number of channels to allow capacity for incoming calls, but the servicing ports may alternatively be equal to the static number of channels. In one example where there are 1000 channels of the telephone network, there may be 500 service ports. This would leave 500 channels free for incoming calls. Additionally, users may request access to telephony resources as soon as possible or at some time in the future (e.g., a user schedules a call or calls for a later time). A queue popper is preferably a software or hardware mechanism responsible for selecting a call from the call queue to service. There may additionally be a plurality of queue poppers to select calls from a call queue. Additionally or alternatively, the user limits may be adjusted or set according to the needs of a user. A user may have particular requirements based on the nature or characteristics of the application of the user. The user limits are preferably set according to the contract and/or pricing model that a user selects or by any suitable means.

The method of the preferred embodiment may additionally include the step of predicting capacity requirements for the distributed call controller S234. Step S234 functions to assess indicators that correlate to the number of telephone network channels needed at a later point. The predicting of capacity is preferably accomplished by programmatically or mathematically (through pattern detection or any suitable algorithm) analyzing current and past information but any suitable method may alternatively be used. Patterns in capacity needs are preferably found related to the time of day, day of the week, yearly patterns, usage patterns (such as if an increase in capacity needs by one user indicates increase in capacity needs by other users), call location, call duration of calls, and/or any suitable indicator. The predictions of Step S234 may additionally be used for realtime provisioning, deprovisioning, and/or reprovisioning capacity of the distributed call controller or planning capacity requirements of the static capacity of the telephone network.

The method of the preferred embodiment may additionally include the step of reacting to capacity needs of the call queue S236. Step S236 functions to use the call queue and other current capacity indicators to adjust the distributed call controller for the current capacity requirements or anticipated near term requirements. The call queue is preferably assessed through software or alternatively by any suitable monitoring of the call queue. The number of calls currently in the queue, the total number of users currently using the telephone network, incoming calls (that may be not be queued), the frequency of user requests, and/or any suitable characteristic of the telephone network or the call queue preferably cause a reaction to the capacity needs. The reaction is preferably for current overall capacity needs but may alternatively be for current capacity needs of an individual user or any suitable party. The reactions may include adjusting the settings of the call queue (such as call queue service rate or ordering), modifying user limits, adjusting capacity of the distributed telephone controller, and/or any suitable action. In one example, a call queue may have many calls scheduled for 100 seconds after the current time, the distributed call controller may increase capacity to accommodate the anticipated capacity requirements.

The method of the preferred embodiment may additionally include the step of analyzing capacity needs of a user and predicting the telephone network capacity needs S238. Step S238 functions to detect individual capacity needs to determine total capacity requirements of the telephone network. Capacity needs of a user are preferably acquired by analyzing a telephony application of a user. Part of the analysis preferably includes detecting periodic events that indicate capacity needs of an individual application. An example of such an event might be an application associated with a weekly TV show where callers call in around the air time of the show. The analysis may alternatively or additionally include detecting typical call duration for an individual application. Some applications may only be used for a brief amount of time (such as when a short message is played), while other applications may require longer durations of use (such as when a user must navigate a long phone tree). Additionally, application history may be used to determine usage patterns such as by monitoring maximum, minimum, and/or average capacity requirements, frequency of requests, duration of requests, number of SMS messages sent in a particular time duration, and/or any suitable call characteristic. Usage characteristics of the individual applications of users are preferably combined with the usage characteristics of the other users to determine the total usage characteristics and capacity needs of the telephone network. Preferably, the code of the application is preferably analyzed to assess the functionality and usage patterns of the application. The application code or operation is preferably programmatically analyzed, but any suitable method may be used. Alternatively, the user and/or a second party may characterize the application and/or telephony service of the user. This characterization is preferably performed by the user while signing up, and preferably includes user expectations for the frequency of use, times of use, duration of calls, and/or any suitable characteristic of the application. The user may additionally prioritize when capacity should be highest for their application. Any suitable steps may be used to analyze an individual application.

As an additional alternative to the preferred embodiment, the method may include adjusting capacity of the distributed call controller S240. Step S240 functions to change the number of active channels of the telephone network to appropriately handle the capacity requirements. Step S240 is preferably used in combination with Step S212, which includes operating a distributed call controller. The adjustments to the distributed call controller adjust the capacity capability that the operator offers. The capacity is preferably adjusted based on the management of the usage of channels of the telephone network. The capacity is more preferably adjusted based on the predictions and analysis of Steps of S234 and/or S236, but may alternatively be adjusted in cooperation with Step S232, Step S238, and/or for any suitable reason. When more capacity is needed, more resources, such as CPU, RAM, DISK, etc., capable of handling simultaneous channels or providing more channels, are preferably allocated to the distributed telephone controller, and conversely when less capacity is required, resources are preferably deallocated from the distributed telephone controller. The adjustment of capacity is preferably made to handle the expected or predicted capacity. The static capacity of the telephone network may alternatively or additionally be adjusted. As the telephone network capacity is typically less flexible. Adjustments to the telephone network capacity are preferably made for long-term capacity needs (e.g., on a per month basis). Any suitable adjustment to the system for more or less capacity may alternatively be used.

4. Method of Distributing Calls Between Telephony Hardware

Figure 7:
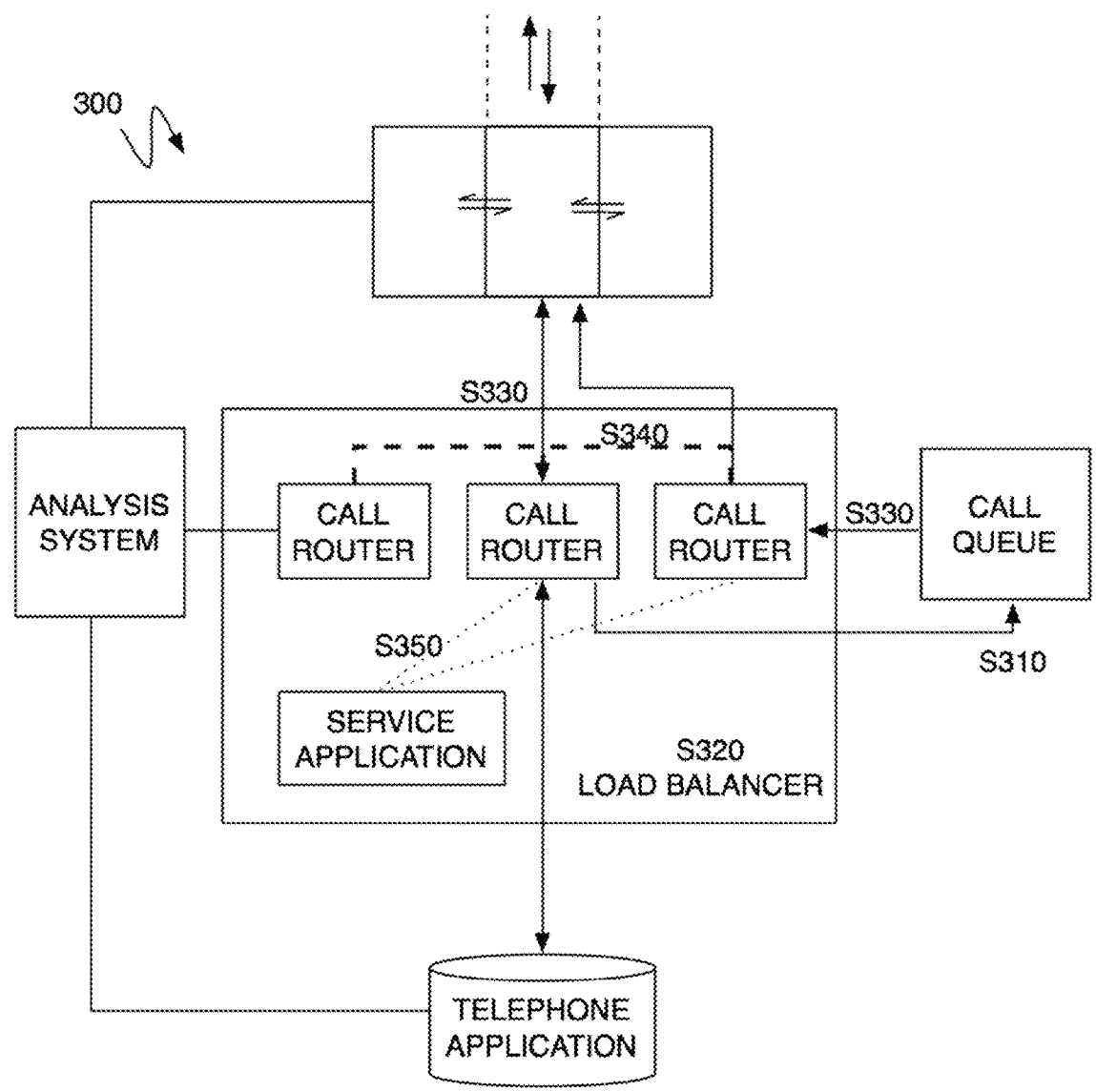
FIG. 7 is a flowchart of a preferred embodiment of the invention implementing a conference call.
Figure 8:
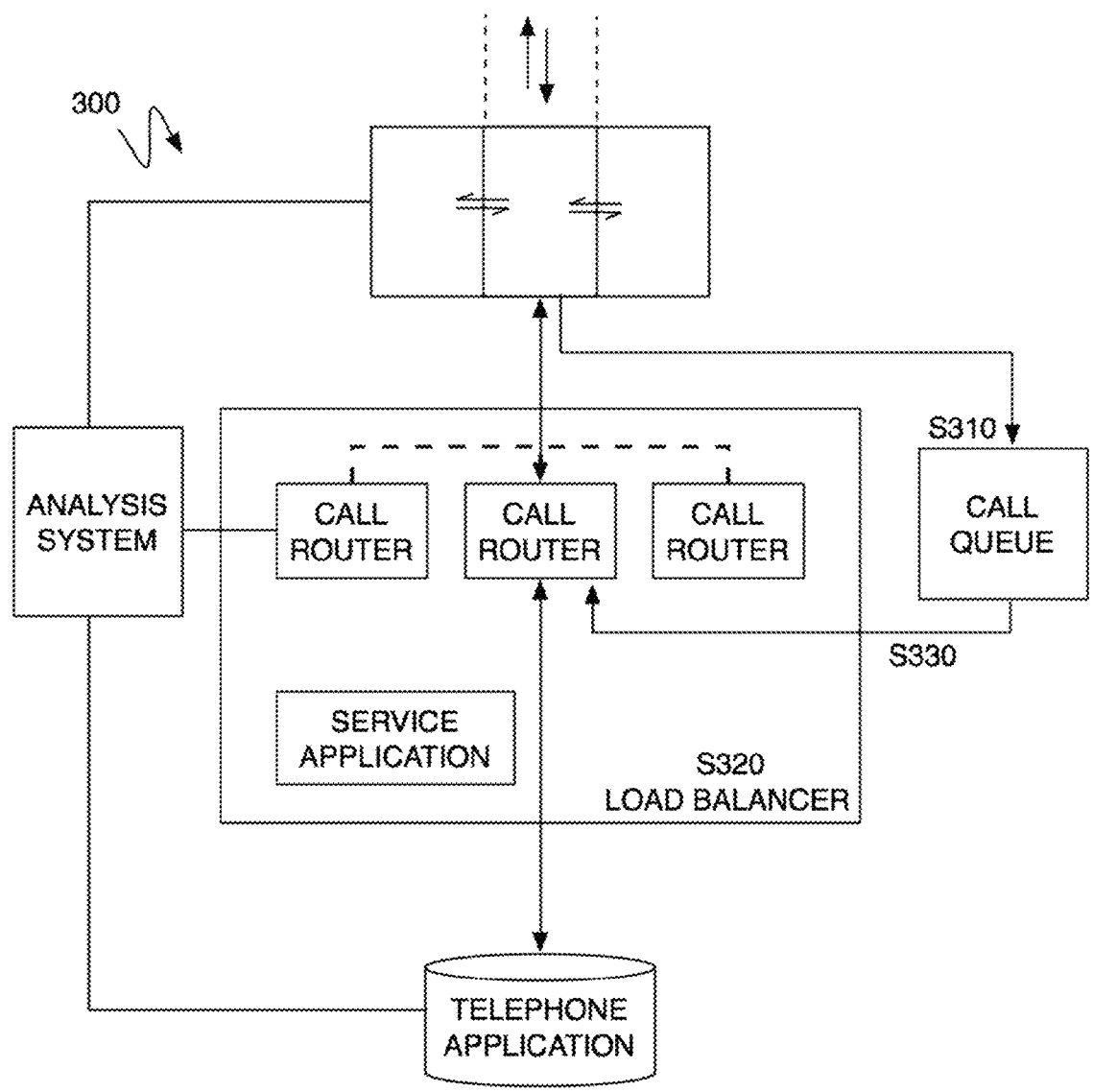
FIG. 8 is a flowchart of preferred embodiment of the invention receiving an incoming call.

As shown in FIGS. 7-8, the method 300 of distributing calls between telephony hardware of the preferred embodiment includes the steps of queuing a call request S310, selecting a load balancing call router S320, and connecting a call with the selected call router S330. The method functions to balance usage of resources used in a telephony application. This method is preferably implemented on a system substantially similar to the one described above, but any suitable system may alternatively be used.

Step S310, which includes queuing a call request, functions to manage a call request until the necessary resources are available to service the call. A call request is preferably instantiated by a telephony application, a call router, a telephony device, and/or any suitable source of a call request. The call request may additionally be a SMS or MMS message request. The call request is preferably outgoing. An incoming call is preferably viewed as a more urgent call request than an outgoing request, and an incoming call may not be queued but alternatively may be passed directly to an available resource. Alternatively incoming call requests (call session initiations) may be queued, but since incoming calls have more immediacy they are preferably prioritized or the system must be have short queuing wait where a short wait is less than the time it would take for an incoming call to fail. The incoming call may alternatively be placed near the front of a queue or positioned in the queue according to separate rules appropriate for the higher priority of the call request. Similarly, a synchronous outgoing call request may be queued with high priority. A synchronous call is a call that another caller is relying on to proceed, as opposed to a new call initiated by an application in which a user will not notice a delay. Call requests are preferably ordered in the queue according to rules based on the throttle, caps, real-time urgency (priority) and/or any suitable factors.

Step S320, which includes selecting a load balancing call router, functions to identify a call router that should handle the call to preferably optimize the operation of a telephone resource cluster. The selected call router is typically the call router with the least load, but may alternatively be selected to optimize cost, energy usage, processing capability, and/or any suitable variable. Step S320 may additionally be applied to other hardware or software resources in addition to or alternatively to a call router. Call routers of a telephone resource cluster may have variable capacity and performance depending on hardware and/or software specs. The variability between the plurality call routers is preferably considered in selecting a call router. A load balancer substantially similar to the one described above is preferably the component that implements step S320, though step S320 may be performed by any suitable device. The load balancer is preferably capable of allocating and deallocating resources of the cluster, and so resources may be allocated and/or deallocated as a substep of S320. The resource allocator can preferably allocate and deallocate call routers, hardware resources, and/or software resources. The resources are preferably allocated or deallocated based on current or predicted utilization, but the resources may alternatively be allocated or deallocated as a function of other resources. For example, one media processing resource may be allocated (e.g., operating) for every five call routers. The selection of a load balancing call router preferably uses data from an analysis system. So that the step of selecting a load balancing call router may include selecting a call router that will balance load at a future time.

Step S330, which includes connecting a call with a selected call router, functions to pass control of the call to the specified resource. For an outgoing call, a call router preferably connects through a telephone network to the designated phone number. For an incoming call, the call router preferably connects to the specified telephony application; PSTN-connected device(s), such as landlines, cellular phones, satellite phones, or any other suitable PSTN-connected devices; non-PSTN devices, such as Voice-Over-Internet-Protocol (VOIP) phones, SIP devices, Skype, Gtalk, or other Internet addressable voice devices; and/or any suitable device associated with the number of the incoming call.

The method of the preferred embodiment may additionally include networking call routers that have a shared application S340. Step S340 functions to allow communication between multiple call routers. This is preferably useful in situations where functionality of an application is distributed over multiple resources (e.g., multiple call routers). The network preferably allows sharing of resources between call routers. Audio channels of call routers may additionally be mixed and shared between call routers. A VOIP channel is preferably formed over the network for bridging audio of different call routers. For example, a conference call may use the network to bridge audio of multiple call sessions from different call routers.

The method of the preferred embodiment may additionally include synchronizing applications with a service application S350. The service application functions to monitor an application distributed over a call router cluster and coordinate operation of the application. The service application may additionally be used to share state information between the call routers. The service application preferably provides a specific functionality such as a hang up service or a multiple input service as described above. Any suitable application may be implemented by the service application such as input-gathering, multi-dialing, call splitting, call merging, and any suitable feature. Any number of service applications may be used.

As a person skilled in the art will recognize from the previous detailed description and from the figures and claims, modifications and changes can be made to the preferred embodiments of the invention without departing from the scope of this invention defined in the following claims.

We claim:

1. A method comprising: at a multi-tenant communication platform system that includes at least a first call router and a first PSTN network channel:
   responsive to a first outbound voice call request of a first platform account included in a first HTTP message provided by a first external server system, the first call router servicing the first outbound voice call request by establishing a first voice call session to a first destination telephony endpoint via the first PSTN network channel;
   the first call router generating a first call router application programming Interface (API) resource that includes state of the first voice call session; and
   responsive to a first call router API request of the first platform account included in a second HTTP message provided by the first external server system, the platform system providing the first external server system with the state of the first voice call session in a third HTTP message, wherein the first call router API request specifies a URI of the first call router API resource.

2. The method of claim 1, further comprising:
   responsive to a second outbound voice call request of a second platform account included in a fourth HTTP message provided by a second external server system, the first call router servicing the second outbound voice call request by establishing a second voice call session to a second destination telephony endpoint via the first PSTN network channel;
   the first call router generating a second call router API resource that includes state of the second voice call session; and
   responsive to a second call router API request of the second platform account included in a fifth HTTP message provided by the second external server system, the platform system providing the second external server system with the state of the second voice call session in a sixth HTTP message, wherein the second call router API request specifies a URI of the second call router API resource.

3. The method of claim 2,
   wherein during servicing of the first outbound voice call request and responsive to the second outbound voice call request, the first call router queues the second outbound voice call request at a first call queue of the platform system,
   wherein responsive to the platform system dequeuing the second outbound voice call request, the first call router services the second outbound voice call request.

4. The method of claim 3, wherein the second outbound voice call request is dequeued at an inter-call rate of the second platform account.

5. The method of claim 3, wherein the second outbound voice call request is dequeued responsive to completion of servicing of the first outbound voice call request.

6. The method of claim 2, wherein the first destination telephony endpoint is a phone number and the second destination telephony endpoint is a phone number.

7. The method of claim 2,
   wherein the first external server system provides the first HTTP message and the second HTTP message to the platform system,
   wherein the first external server system provides a first application,
   wherein the second external server system provides the fourth HTTP message and the fifth HTTP message to the platform system,
   wherein the second external server system provides a second application,
   wherein the first call router is a telephony resource of the platform system, and
   wherein the PSTN network channel is a telephone network channel of the platform system.

8. A hardware system comprising:
a multi-tenant communication platform system comprising: a first call router;
and a first PSTN network channel,
wherein responsive to a first outbound voice call request of a first platform account included in a first HTTP message provided by a first external server system, the first call router is constructed to service the first outbound voice call request by establishing a first voice call session to a first destination telephony endpoint via the first PSTN network channel,
wherein the first call router is constructed to generate a first call router application programming Interface (API) resource that includes state of the first voice call session,
wherein responsive to a first call router API request of the first platform account included in a second HTTP message provided by the first external server system, the platform system is constructed to provide the first external server system with the state of the first voice call session in a third HTTP message, and
wherein the first call router API request specifies a URI of the first call router API resource.

9. The system of claim 8,
wherein responsive to a second outbound voice call request of a second platform account included in a fourth HTTP message provided by a second external server system, the first call router is constructed to service the second outbound voice call request by establishing a second voice call session to a second destination telephony endpoint via the first PSTN network channel,
wherein the first call router is constructed to generate a second call router API resource that includes state of the second voice call session,
wherein responsive to a second call router API request of the second platform account included in a fifth HTTP message provided by the second external server system, the platform system is constructed to provide the second external server system with the state of the second voice call session in a sixth HTTP message, and
wherein the second call router API request specifies a URI of the second call router API resource.

10. The system of claim 9,
further comprising: a first call queue,
wherein during servicing of the first outbound voice call request and responsive to the second outbound voice call request, the first call router is constructed to queue the second outbound voice call request at the first call queue,
wherein responsive to the platform system dequeuing the second outbound voice call request, the first call router is constructed to service the second outbound voice call request.

11. The system of claim 9, wherein the first destination telephony endpoint is a phone number and the second destination telephony endpoint is a phone number.

12. The system of claim 8,
the hardware system further comprising the first external server system,
wherein the first external server system is constructed to provide the first HTTP message and the second HTTP message to the platform system,
wherein the first external server system provides a first application;
wherein the first call router is a telephony resource of the platform system, and wherein the PSTN network channel is a telephone network channel of the platform system.

13. The system of claim 10,
the hardware system further comprising the first external server system and the second external server system,
wherein the first external server system is constructed to provide the first HTTP message and the second HTTP message to the platform system,
wherein the second external server system is constructed to provide the fourth HTTP message and the fifth HTTP message to the platform system,
wherein the first external server system is constructed to provide a first application;
wherein the second external server system is constructed to provide a second application;
wherein the first call router is a telephony resource of the platform system, and
wherein the PSTN network channel is a telephone network channel of the platform system.

14. The system of claim 13, wherein the second outbound voice call request is dequeued at an inter-call rate of the second platform account.

15. The system of claim 13, wherein the second outbound voice call request is dequeued responsive to completion of servicing of the first outbound voice call request.

16. A method comprising:
a first application server system providing an HTTP first outbound voice call request to a multi-tenant communication platform system that includes a first call router telephony resource and a first telephone network channel;
the first call router servicing the first outbound voice call request by establishing a first voice call session to a first destination telephony endpoint via the first telephone network channel;
the first call router generating a first call router application programming Interface (API) resource that includes state of the first voice call session;
the first application server system providing an HTTP first call router API request to the platform system, wherein the first call router API request specifies a URI of the first call router API resource;
responsive to the first call router API request, the platform system providing the first application server system with the state of the first voice call session in an HTTP message.

17. The method of claim 16, wherein the first telephone network channel is a PSTN network channel.

18. The method of claim 16, wherein the HTTP first outbound voice call request and the HTTP first call router API request are requests of a first platform account of the platform system.

19. The method of claim 18, further comprising:
a second application server system providing an HTTP second outbound voice call request to the platform system;
the first call router servicing the second outbound voice call request by establishing a second voice call session to a second destination telephony endpoint via the first telephone network channel;
the first call router generating a second call router application programming Interface (API) resource that includes state of the second voice call session;
the second application server system providing an HTTP second call router API request to the platform system, wherein the second call router API request specifies a URI of the second call router API resource;

responsive to the second call router API request, the platform system providing the second application server system with the state of the second voice call session in an HTTP message.

20. The method of claim 19, wherein during servicing of the first outbound voice call request and responsive to the second outbound voice call request, the first call router queues the second outbound voice call request at a first call queue of the platform system, wherein responsive to the platform system dequeuing the second outbound voice call request, the first call router services the second outbound voice call request.

* * * * *